United States Patent [19]

Horneff

[11] Patent Number: 4,763,434

[45] Date of Patent: Aug. 16, 1988

[54] FISHING POLE WITH LIQUID FISH SCENT PUMP

[76] Inventor: Robert Horneff, 8040 Smokewood Dr., Santee, Calif. 92071

[21] Appl. No.: 906,021

[22] Filed: Sep. 11, 1986

[51] Int. Cl.$^4$ ............................................. A01K 87/00
[52] U.S. Cl. .......................................... 43/18.1; 43/25; 43/44.99
[58] Field of Search ......................... 43/18.1, 25, 44.99

[56] References Cited

U.S. PATENT DOCUMENTS

| | | | |
|---|---|---|---|
| 2,583,660 | 1/1952 | Moore | 43/25 |
| 2,687,541 | 8/1954 | Bannister | 43/25 X |
| 3,269,049 | 8/1966 | Emmons | 43/23 |
| 3,798,823 | 3/1974 | Watters et al. | 43/44.99 X |
| 3,846,930 | 11/1974 | Brown | 43/25 |
| 4,209,931 | 7/1980 | Vance | 43/24 X |
| 4,223,466 | 9/1980 | King | 43/18.1 |
| 4,602,453 | 7/1986 | Polley | 43/44.99 |

*Primary Examiner*—Nicholas P. Godici
*Assistant Examiner*—Carmine Cuda
*Attorney, Agent, or Firm*—Charles C. Logan, II

[57] ABSTRACT

A fishing pole having a tubular rod with a handgrip attached to its rearward end. A pump assembly is mounted in said handgrip and its inlet port is connected to a container formed within the handgrip that is filled with liquid fish scent. The output end of the pump assembly is connected to an output tube that passes through the interior of the tubular rod and which ends adjacent the forward end of the tubular rod. By actuating a trigger finger connected to the pump assembly, the liquid fish scent is pumped through the output tube and exits from its forward end in droplets of fluid that drip down onto a fishing line running through an eyelet tip that is positioned at the end of the tubular rod. The liquid fish scent in its droplet form will travel down the downwardly extending fishing line and apply itself to the hook and the bait which is attached thereto. Periodically while fishing, the fisherman can actuate the trigger finger a few times prior to casting to rewet the hook and bait.

6 Claims, 1 Drawing Sheet

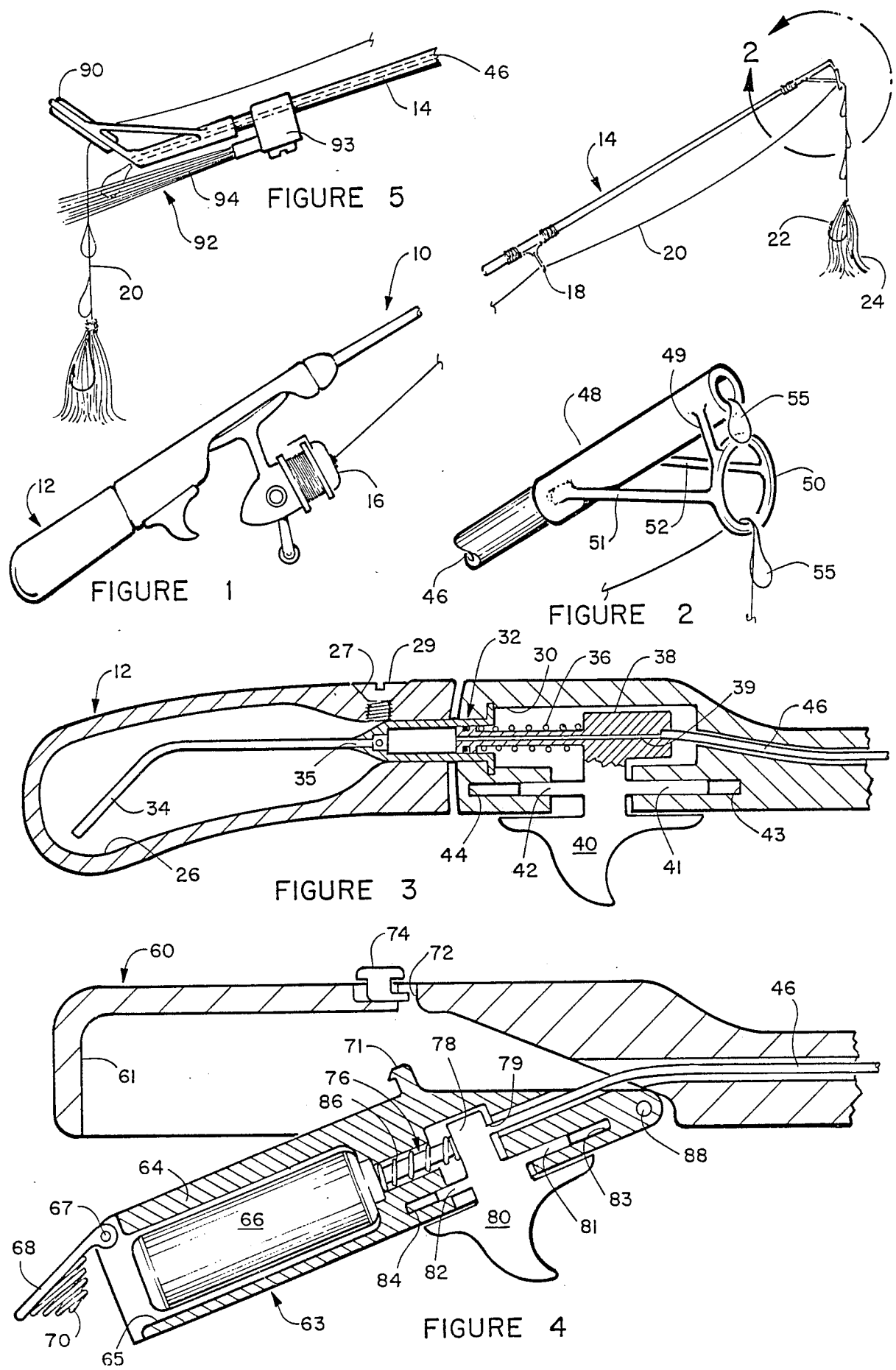

FISHING POLE WITH LIQUID FISH SCENT PUMP

BACKGROUND OF THE INVENTION

The invention relates to fishing and more specifically to a fishing pole having structure that allows liquid fish scent to be applied to the fishing line as it passes through the front tip fishing pole eyelet.

In the past it has been known that liquid fish scent, also known as fish attractant, is very effective influencing fish in the water to approach a fish hook or bait thereon. This liquid fish scent stimulates predator instincts and excites the fish into striking. In the past, the fisherman would buy a small container of the liquid scent and apply a small amount of it on his hook or lure. Each time he wanted to add more liquid fish scent, it was necessary to get out the container, open it and apply the liquid fish scent to the hook or lure. This was a cumbersome approach and usually it resulted in the fisherman only applying the liquid fish scent as he initially started to fish.

Other inventors have taken different approaches in trying to use the liquid fish scent to their advantage. The Hsu, U.S. Pat. No. 4,205,476 is directed to a fishing lure having a chamber within it for receiving a fish attractant. There are a plurality of apertures on the side of the lure which allows the fish attractant to be spread into the water surrounding the fishing lure.

Another example of use of a fish attractant is illustrated in the Carr, U.S. Pat. No. 4,245,420. He utilizes an artifical bait comprising a water-insoluable matrix which is permeable by difussion at a predetermined and controlled rate over a long period of time to an attractant incorporated therein upon immersion in an aqueous medium.

The Larew, U.S. Pat. No. 4,530,179 is directed to a fishing lure having a body part made of a vinyl plastisol having incorporated throughout the plastisol a sufficient quantity of salt to give the lure a salty taste.

It is an object of the invention to provide a novel fishing pole that incorporates structure which will allow the fisherman to periodically apply a fish attractant to this hook or lure merely by squeezing a trigger on the side of his handgrip.

It is also an object of the invention to provide a novel fishing pole that has structure for storing liquid fish scent in the handle of a fishing pole.

It is another object of the invention to provide a novel fishing pole that is economical to manufacture and market.

SUMMARY OF THE INVENTION

Applicant's novel fishing pole has been designed to incorporate structure which will allow liquid fish scent to be applied to the fishing line. The structure which is used minimizes the amount of redesigning that would be necessary to existing fishing poles. Presently a large number of rods of fishing poles are tubularly shaped. This is the type of rod that would be used with applicant's novel fishing pole and the handle would be designed to incorporate the structure of a pump assembly. The handle assembly would also have a cavity or chamber for storing liquid fish scent. The inlet port of the pump would be connected to the liquid fish scent container or chamber and the outlet port of the pump would be connected to an output tube that is threaded through the interior of the tubular rod to its front end. The pump assembly would have a trigger finger that could be actuated by a fisherman at any time to pump droplets of liquid fish scent up through the output tube thereby allowing it to drip onto a fishing line passing through the eyelets on the tubular rod.

DESCRIPTION OF THE DRAWINGS

FIG. 1 is a perspective view of applicant's novel fishing pole;

FIG. 2 is an enlarged view of the forward end of the fishing pole illustrated in FIG. 1;

FIG. 3 is a cross-sectional elevation view of the handgrip portion of the fishing pole;

FIG. 4 is a cross-sectional elevation view of an alternative structure for the handgrip of applicant's novel fishing pole; and FIG. 5 is a side elevation view of an alternate structure for the end of the fishing pole.

DESCRIPTION OF THE PREFERRED EMBODIMENT

Applicant's novel fishing pole will now be described by referring to FIG. 1–5 of the drawing. The fishing pole is generally designated numeral 10.

Fishing rod 10 has a handgrip 12 and a tubular rod 14. A fishing reel 16 is mounted on handgrip 12. A plurality of eyelets 18 are attached to the rod 14 and a fishing line 20 pases through these eyelets. A hook 22 is attached to the end of fishing line 20 and it has bait 24 thereon.

In FIG. 3 the handgrip 12 is illustrated in a cross sectional elevation view. It shows that a fluid chamber 26 is formed therein for receiving liquid fish scent. A filler hole 27 is formed in the side wall and it is closed by a removable screw plug 29. A chamber 30 is also formed in handgrip 12 and a pump assembly 32 is positioned therein. A suction tube 34 is attached to the inlet port 35 of the pump assembly 32. The pump assembly has a return spring 36, an actuator member 38 and an outlet port 39 formed therein. A trigger finger 40 is integrally formed with actuator member 38 and it has guide pins 41 and 42 that respectively travel in guide channels 43 and 44. An output tube that is threaded through the interior of tubular rod 14 has its one end connected to outlet port 39 and its forward end is located within the forward end eye-tip 48 that is mounted on the forward end of tubular rod 14.

Eye-tip 48 has a pair of downwardly extending arms 49 having a ring portion 50 attached thereto. A plurality of braces 51 and 52 secure ring portion 50. As noted in FIG. 2, as the drops of liquid fish scent are pumped up the output tube 46, the drops 55 of liquid fish scent will fall onto the fishing line 20 and run down its exterior to the hook 22 and the bait 24 thereon. It can be easily understood that a mere couple of squeezes of trigger finger 40 will pump a sufficient number of drops 55 of liquid fish scent up to the tip of the fishing pole and allow the fishing line and its hook and bait to be wetted prior to casting.

An alternative handgrip 60 is illustrated in FIG. 4. It has a cavity 61 for receiving a pump and cartridge assembly 63. The pump and cartridge assembly 63 has a body 64 having a chamber 65 formed in its rear end. A cartridge 66 of liquid fish scent is detachably received in chamber 65 and a cap 68 closes the chamber 65. Cap 68 is pivotally mounted on a pivot pin 67 and a spring 70 is mounted on the interior surface of cap 68. A latch 71 extends upwardly from body 64 and it is received in recess 72 in the top wall of handgrip 60. A latch lock 74 is slidable axially to capture latch 71 and also to release it when so desired. A pump assembly 76 is also mounted in body 64 and it would have an actuator member 78 and an outlet port 79. A trigger finger 80 is formed integrally with actuator 78 and it has a guide pin 81 and 82 that are respectively received in guide channels 83 and 84. A spring 86 returns the trigger to its forward position after pulling. The pump and cartridge assembly 63 has its forward end pivoted about a hinge pin 88. The rear end of output tube 46 is connected to the outlet port 79 of the pump 76. Pump 76 would operate in a manner similar to the previously described pump and deliver drops of liquid fish scent to the forward end of output tube 46 where it would be dispensed upon the fish line 20.

In FIG. 5 the end of a different tubular rod 14 is illustrated. On this model of fishing pole the eyelet 90 is mounted to the top of tubular rod 14. This structure necessitates the addition of a clip and brush assemlby 92 that snaps onto the exterior of tubular rod 14. The clip 93 could take any of many structures as long as it provides the function of clipping the assembly to the tubular rod 14. The brush 94 extends forwardly a sufficient distance so that it intercepts the fishing line 20. As a result, liquid fish scent that has been pumped through the output tube 46 delivers drops 55 that wet the individual strands of brush 94. As fishing line 20 passes through these strands of brush, the drops 55 would then travel down the fishing line to the hook and bait thereon.

What is claimed is:

1. A fishing pole comprising:
    a tubular rod having a predetermined length, said tubular rod having a forward end and a rearward end, a plurality of eyelets are attached to said tubular rod at predetermined locations along the length of said tubular rod and eye-tip is attached to the forward end of said tubular rod, said eye-tip having a ring portion that is positioned immediately beneath the forward end of said tubular rod;
    an elongated handgrip is attached to the rearward end of said tubular rod, said elongated handgrip extends longitudinally from the rearward end of said tubular rod;
    means for storing liquid fish scent in said longitudinally extending handgrip;
    a pump assembly mounted in said elongated handgrip having an inlet port and an outlet port, said inlet port being connected to said means for storing liquid fish scent; and
    an output tube having a predetermined length, said output tube having its one end connected to the outlet port of said pump assembly, said output tube being threaded through the interior of said tubular rod from its rearward end to its forward end so that when said pump assembly is actuated, the liquid fish scent will be dispensed from the forward end of said tubular rod onto a fishing line threaded through the ring portion of the eye-tip of said tubular rod.

2. A fishing pole as recited in claim 1 wherein said means for storing liquid fish scent is a fluid chamber formed in said handgrip.

3. A fishing pole as recited in claim 1 wherein said means for storing liquid fish scent is a cartridge.

4. A fishing pole as recited in claim 3 wherein said handgrip has a chamber in it for removably receiving said cartridge of liquid fish scent.

5. A fishing pole as recited in claim 1 wherein said pump assembly has a trigger finger for actuating it.

6. A fishing pole comprising:
    a tubular rod having a predetermined length, said tubular rod having a forward end and a rearward end, a plurality of eyelets are attached to said tubular rod at predetermined locations along the length of said tubular rod;
    a handgrip is attached to the rearward end of said tubular rod;
    means for storing liquid fish scent;
    a pump assembly having an inlet port and an outlet port, said inlet port being connected to said means for storing liquid fish scent;
    an output tube having a predetermined length, said output tube having its one end connected to the outlet port of said pump assembly, said output tube being threaded through the interior of said tubular rod so that when said pump assembly is actuated, the liquid fish scent will be dispensed onto a fishing line threaded through the eyelets of said tubular rod; and
    means for applying liquid fish scent to a fishing line comprising a brush attached to said tubular rod adjacent its forward end, said brush extending into the path of a fishing line threaded through the eyelets so that by applying the liquid fresh scent to said brush it will result in the fish scent being transferred to a fishing line therethrough.

* * * * *